(12) United States Patent
Chen et al.

(10) Patent No.: US 11,804,601 B2
(45) Date of Patent: Oct. 31, 2023

(54) CATHODE MATERIALS FOR LITHIUM ION BATTERIES

(71) Applicant: SAFT AMERICA, Cockeysville, MD (US)

(72) Inventors: Xilin Chen, Timonium, MD (US);
Saori Tokuoka, Towson, MD (US);
Frank Cao, North Potomac, MD (US);
Jian Dong, Timonium, MD (US);
Carine Margez, Baltimore, MD (US);
Owen Ou, Gaithersburg, MD (US);
Thomas Greszler, Phoenix, AZ (US)

(73) Assignee: SAFT AMERICA, Cockeysville, MD (US)

( * ) Notice: Subject to any disclaimer, the term of this patent is extended or adjusted under 35 U.S.C. 154(b) by 375 days.

(21) Appl. No.: 16/569,116

(22) Filed: Sep. 12, 2019

(65) Prior Publication Data
US 2021/0083289 A1   Mar. 18, 2021

(51) Int. Cl.
*H01M 4/58* (2010.01)
*H01M 4/525* (2010.01)
(Continued)

(52) U.S. Cl.
CPC ......... *H01M 4/5825* (2013.01); *H01M 4/525* (2013.01); *H01M 10/0525* (2013.01);
(Continued)

(58) Field of Classification Search
CPC .... H01M 4/364; H01M 4/525; H01M 4/5825; H01M 2004/028; H01M 10/0563; H01M 10/0568
See application file for complete search history.

(56) References Cited

U.S. PATENT DOCUMENTS

| | | |
|---|---|---|
| 6,746,799 B2 | 6/2004 | Yamada et al. |
| 8,828,605 B2 | 9/2014 | Lampe-Onnerud |

(Continued)

FOREIGN PATENT DOCUMENTS

| | | |
|---|---|---|
| EP | 2737565 A1 | 6/2014 |
| JP | 2011-113783 A | 6/2011 |

(Continued)

OTHER PUBLICATIONS

Internal Search Report dated Dec. 8, 2020 issued by the International Searching Authority in Application No. PCT/IB2020/058445.

*Primary Examiner* — Brittany L Raymond
(74) *Attorney, Agent, or Firm* — Sughrue Mion, PLLC

(57) ABSTRACT

Provided is a positive electrode active material for a lithium-ion battery, the positive electrode active material including a blend of a doped lithium manganese iron phosphate (dLMFP) according to the formula: $LiMn_xFe_yM_{1-x-y}PO_4$, wherein $0.9<x+y<1$; and M is one or more selected from the group consisting of Mg, Ca and Ba with one or both of a lithium nickel cobalt manganese oxide (NMC) compound having a Ni content greater than 0.6 relative to a total amount of metals other than Li and a lithium nickel cobalt aluminum oxide (NCA) compound. In particular, provided is a blend at a weight ratio of dLMFP to NMC and/or NCA (i.e., dLMFP:(NMC+NCA)) of >70:<30, such as 75:25, 80:20, 85:15, 90:10, etc.

17 Claims, 4 Drawing Sheets
(4 of 4 Drawing Sheet(s) Filed in Color)

(51) Int. Cl.
  H01M 10/0525 (2010.01)
  H01M 10/0563 (2010.01)
  H01M 10/0568 (2010.01)
  H01M 4/02 (2006.01)

(52) U.S. Cl.
  CPC ... H01M 10/0563 (2013.01); H01M 10/0568 (2013.01); *H01M 2004/028* (2013.01); *H01M 2300/002* (2013.01)

(56) References Cited

U.S. PATENT DOCUMENTS

| | | | |
|---|---|---|---|
| 2001/0055718 A1* | 12/2001 | Li | H01M 4/625 429/221 |
| 2002/0004169 A1 | 1/2002 | Yamada et al. | |
| 2007/0141468 A1* | 6/2007 | Barker | H01M 4/525 429/231.1 |
| 2011/0052988 A1* | 3/2011 | Beck | H01M 4/5825 429/221 |
| 2011/0223482 A1 | 9/2011 | Fujii et al. | |
| 2014/0138591 A1* | 5/2014 | Yoon | H01M 4/525 429/221 |
| 2015/0270544 A1* | 9/2015 | Yoshida | H01M 4/5825 429/209 |
| 2016/0149205 A1* | 5/2016 | Theivanayagam | H01M 4/0435 429/221 |
| 2016/0233488 A1 | 8/2016 | Krkljus et al. | |
| 2018/0145314 A1 | 5/2018 | Dumont et al. | |

FOREIGN PATENT DOCUMENTS

| | | |
|---|---|---|
| WO | 2013/016426 A1 | 1/2013 |
| WO | 2013/052494 A1 | 4/2013 |
| WO | 2019/204659 A1 | 10/2019 |
| WO | 2020/146218 A1 | 7/2020 |

* cited by examiner

CATHODE MATERIALS FOR LITHIUM ION BATTERIES

BACKGROUND

Technical Field

The present disclosure relates to active materials intended to be used in the positive electrode (or cathode) of a rechargeable lithium electrochemical cell (or secondary cell) and also relates to a lithium-ion secondary battery including a cathode having the positive electrode active material.

Description of Related Art

In a secondary cell, an active material is a material which participates in the electrochemical reactions to produce electrical energy when the secondary cell is discharging. Transition metal lithiated oxides are known as a cathodic active material able to be used in lithium secondary cells. In the positive electrode, lithiated oxides of transition metals of general formula $LiMO_2$, in which M represents at least one transition metal, such as Mn, Ni, Co or a mixture thereof, are frequently used as the active material. These active materials allow high performance to be achieved, in particular in terms of cyclic reversible capacity (wherein reversible capacity represents the stable capacity that is delivered by the electrode, after the formation cycles are completed) and lifetime. For example, $LiCoO_2$ and $LiNiO_2$ have respectively a capacity of about 180 and 220 mAh/g. $LiCoO_2$, however, has two major disadvantages, which are its toxicity and high cost.

It is also known to use a lithiated oxide of manganese belonging to the family of spinels and having the formula $LiMn_2O_4$. This compound has a low cost and an absence of toxicity but has a reduced capacity (110 mAh/g) and a reduced lifetime resulting from the significant dissolution of the oxide in the electrolyte of the secondary cell.

Another known active cathode material is the compound $Li(Ni_{0.8}Co_{0.15}Al_{0.05})O_2$, which is a lithiated oxide of nickel-cobalt-aluminum (or NCA). This material is used in the positive electrode of lithium rechargeable generators used for industrial application, such as electric hybrid vehicles and space applications. This type of active material however does not have sufficient heat stability. Indeed, in the case of overcharging or accidental short-circuiting of the generator, a significant and sudden rise in temperature occurs, due to an exothermic reaction of the active material with the electrolyte. Given that most materials have a very unstable structure, overheating causes degradation of these active materials. Insufficient heat stability of these positive electrode materials poses a safety problem when they are used in small generators intended to provide strong currents (power elements).

Other active materials with a lower cost than $LiCoO_2$ and exhibiting good thermal stability and an absence of toxicity have been studied, among which there are the lithiated phosphates of at least one transition metal, such as $LiFePO_4$ and $LiMnPO_4$. However, the use of $LiFePO_4$ and $LiMnPO_4$ is hampered by their low electron conductivity. It is generally necessary to add to the electrode a high proportion of an electron-conducting material in order to obtain a secondary cell having good discharge performance at a high current. In addition, $LiFePO_4$ has a low specific energy, due to its low electrochemical operating potential. $LiMnPO_4$ has a higher operating potential, but on the other hand exhibits poor life when it is used as a positive electrode material in conjunction with a negative electrode of graphite in a secondary cell operating under cycling conditions. Moreover, it is difficult to reduce the porosity of an electrode produced with either of these materials, which leads to a low capacity per unit mass of the cell containing these materials.

US 2002/0004169 (US '169) discloses a lithium ion cell that is less costly than a conventional lithium ion cell. US '169 discloses that the lithium ion cell is improved in operational stability under special conditions, such as high temperatures, and exhibits superior characteristics against over-discharging, while guaranteeing compatibility to the operating voltage of a conventional lithium ion cell and an energy density equivalent to that of the conventional lithium ion cell. For this purpose, US '169 discloses a positive electrode active material which is a composite material of a first lithium compound represented by the formula $LixMyPO4$, where $0<x<2$, $0.8<y<1.2$ and M contains Fe, and a second lithium compound having a potential nobler than the potential of the first lithium compound. In US '169, there is no clear definition for the potential mentioned. In US '169, the first lithium compound is used to improve stability and reduce cost. In its Examples, US '169 employed combinations of $LiFePO_4$ (LFP) as the first lithium compound with $LiCoO_2$, $LiMn_{0.8}Mg_{0.2}O_2$ or $LiNi_{0.8}Co_{0.2}O_2$ as the second lithium compound. Other Examples employed $LiFe_{0.4}Mn_{0.6}PO_4$ (LFMP) as the first lithium compound with $LiMn_{0.8}Mg_{0.2}O_2$ as the second lithium compound. In the Examples of US '169, the weight ratio of the first lithium compound (LFP or LFMP) to the second lithium compound was from 10:90 to 50:50.

U.S. Pat. No. 8,828,605 (US '605) discloses a positive electrode material mixture that includes: at least one of a lithium cobaltate and a lithium nickelate; and at least one of a manganate spinel represented by an empirical formula of $Li_{(1+x1)}(Mn_{1-y1}A'_{y1})_{2-x1}O_{z1}$ (where A' is at least one of Mg, Al, Co, Ni, and Cr) and an olivine compound represented by a formula of $Li_{(1-x2)}A''_{x2}MPO_4$ (where A" is at least one of Na, Mg, Ca, K, Ni, and Nb; and M is at least one of Fe, Mn, Co and Mg). In another embodiment, US '605 discloses an active cathode material mixture that includes: a lithium nickelate selected from the group consisting of $LiCoO_2$-coated $LiNi_{0.8}Co_{0.15}Al_{0.05}O_2$, and $Li(Ni_{1/3}Co_{1/3}Mn_{1/3})O_2$; and a manganate spinel represented by an empirical formula of $Li_{(1+x7)}Mn_{2-y7}O_{z7}$. In the Examples of US '605, there is no embodiment of a LFMP compound as the manganate spinel, and the embodied manganate spinel compounds were always a minor component of the active material mixtures.

US 2016/0233488 (US '488) discloses a positive electrode material mixture that includes (a) at least one compound of the formula $Li_{(1+x)}[Ni_aCo_bMn_cM1_d]_{(1-x)}O_2$ (where x is 0.01 to 0.05, a is 0.3 to 0.6, b is 0 to 0.35, c is 0.2 to 0.6, d is 0 to 0.05, a+b+c+d=1, $M_1$ is at least one metal selected from Ca, Zn, Fe, Ti, Ba, and Al), (b) at least one compound of formula $LiFe_{(1-x)}M_{2y}PO_4$ (where y is 0 to 0.8, $M_2$ is selected from Ti, Co, Mn, Ni, V, Mg, Nd, Zn and Y), that contains at least one further iron-phosphorous compound, in form of a solid solution in compound (b) or in domains, and (c) carbon in electrically conductive modification. In the Examples of US '488, a LFMP compound was not used as the manganate spinel, and the manganate spinel was always a minor component of the active material mixtures. In the Examples of US '488, there is no embodiment of a LFMP compound as the manganate spinel, and the formula (II) compounds were always a minor component of the active material mixtures.

US 2011/0223482 (US '482) discloses a positive electrode material mixture that includes a lithium manganese iron phosphate (LMFP) and a lithium-nickel-manganese-cobalt composite oxide (NMC). In the Examples of US '482, the weight ratio of LMFP to NMC was 10:90 to 70:30. US '482 does not disclose a doped LMFP.

However, there is still a need for a secondary cell having a high capacity per unit mass, a high cycling life, improved rate capacity, and improved easiness for a battery management system (BMS) and the present disclosure provides a positive electrode active material that addresses these needs.

SUMMARY OF THE DISCLOSURE

The embodiments of the present disclosure are directed to a positive electrode active material including a blend of a doped lithium iron phosphate (dLMFP) with one or both of a lithium nickel cobalt manganese oxide (NMC) compound (i.e., a lithiated oxide of nickel (Ni), manganese (Mn) and cobalt (Co)) having a Ni content greater than 0.6 relative to total amount of metals except Li or a lithium nickel cobalt aluminum oxide (NCA) compound (i.e., a lithiated oxide of Ni, Co and aluminum (Al)), which can address the needs noted above. The embodiments of the present disclosure are also directed to a lithium-ion secondary battery including the positive electrode active material.

In embodiments of the present disclosure, the positive electrode active material includes a doped lithium manganese iron phosphate (dLFMP) compound according to the following formula (1) below:

$$LiMn_xFe_yM_{1-x-y}PO_4 \quad (1),$$

wherein, in formula (1):
0.9<x+y<1; and
M is one or more selected from the group consisting of Co, Ni, V, Y, Mg, Ca, Ba, Al, Sc and Nd.

In some embodiments, the positive electrode active material includes both the lithium nickel cobalt manganese oxide (NMC) compound and the lithium nickel cobalt aluminum oxide (NCA) compound.

In some embodiments, the dLMFP compound is included in the positive electrode active material in an amount greater than 70 wt %, when a total weight of the dLMFP compound, the NMC compound and the NCA compound in the positive electrode active material is considered 100 wt %.

In some embodiments, the amount of the dLMFP compound in the positive electrode active material is 75 wt % or more.

In some embodiments, the positive electrode active material includes both the NMC compound and the NCA compound, and the weight ratio of the NMC compound to the NCA compound (NMC:NCA) is 1:99 to 99:1.

In some embodiments, the NMC compound having a Ni content greater than 0.6 relative to total amount of metals except Li is a lithiated oxide compound according to the following formula (2):

$$Li_{(1+x)}Ni_aMn_bCo_cM'_dO_2 \quad (2),$$

wherein, in formula (2):
0≤x≤0.15,
a>0.6; b>0; c>0; d≥0 and a+b+c+d=1, and
M' is one or more selected from B, Mg, Al, Si, Ca, Ti, V, Cr, Fe, Cu, Zn, Y, Zr, Nb, and Mo.

In some embodiments, the NMC compound is $LiNi_{0.605}Mn_{0.197}Co_{0.198}O_2$ (also referred to herein as NMC 622).

In some embodiments, the NMC compound is $LiNi_{0.8}Mn_{0.1}Co_{0.1}O_2$ (also referred to herein as NMC 811).

In some embodiments, the NCA compound is a lithiated oxide of nickel (Ni), cobalt (Co) and aluminum (Al) according to the following formula (3):

$$Li_{1+x}(Ni_aCo_bAl_c)O_2 \quad (3),$$

wherein, in formula (3):
a, b and c are non-zero,
a+b+c=1, and
0≤x≤0.15.

In some embodiments, the NCA compound is $LiNi_{0.8}Co_{0.15}Al_{0.05}O_2$.

In some embodiments, when both an NMC compound and an NCA compound are included in the blend, the content of Ni in the NMC compound can be 0.6 or less relative to the total amount of metals except Li.

In some embodiments, when the blend contains the dLMFP compound and the NMC compound, the weight ratio dLMFP:NMC can be >70:<30; 75:25; 80:20; 85:15; 90:10; 95:5; 96:4; 97:3; 98:2; or 99:1.

In some embodiments, when the blend contains the dLMFP compound and the NCA compound, the weight ratio dLMFP:NCA can be >70:<30; 75:25; 80:20; 85:15; 90:10; 95:5; 96:4; 97:3; 98:2; or 99:1

In some embodiments, the positive electrode active material according to the present disclosure includes a blend of dLMFP with the NMC compound according to the formula (2) and the NCA compound according formula (3).

In another embodiment of the present disclosure, a lithium-ion secondary battery is disclosed which includes a cathode including a positive electrode active material according to any of the embodiments of the present disclosure.

BRIEF DESCRIPTION OF THE FIGURES

The application file contains at least one drawing executed in color. Copies of this patent application publication with color drawing(s) will be provided by the Office upon request and payment of the necessary fee.

Any figures contained herein are provided only by way of example and not by way of limitation.

DETAILED DESCRIPTION OF EMBODIMENTS OF THE DISCLOSURE

Figure 1A:
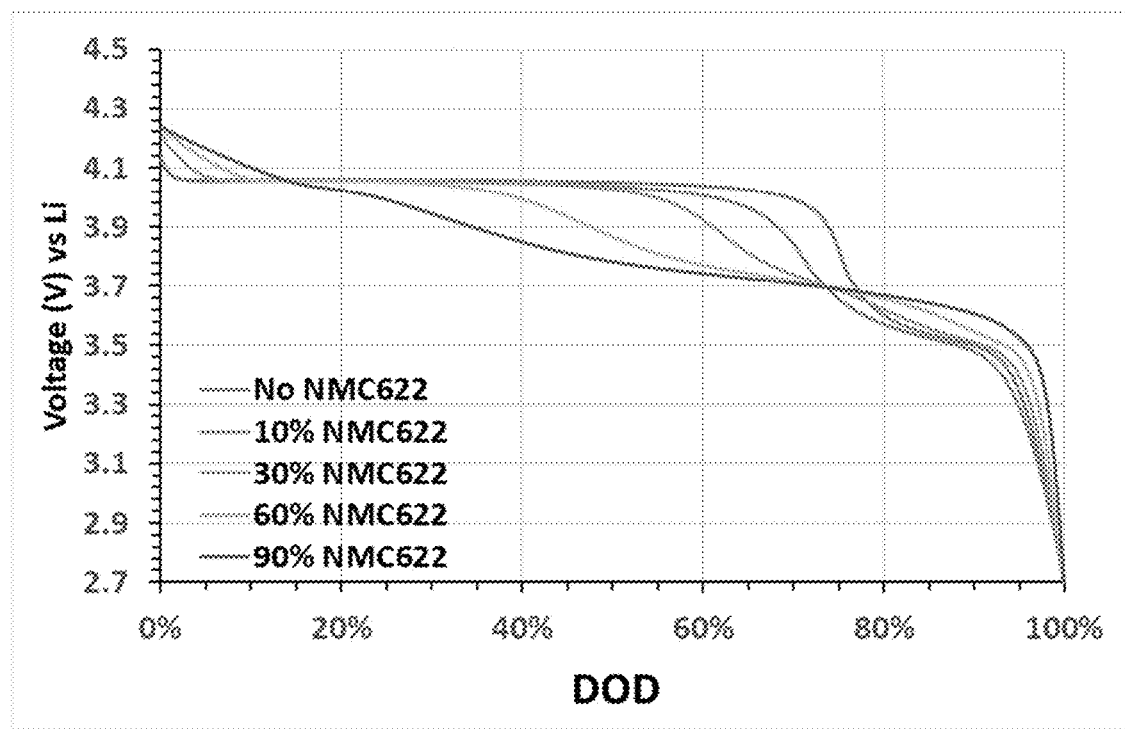
FIG. 1A is a graph showing voltage (V) versus depth of discharge (DoD) for the half cells prepared in Example 1.

It is to be understood that both the foregoing general description and the following detailed description are exemplary and are intended to provide further explanation of the claims. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Any range will be understood to encompass and be a disclosure of each discrete point and subrange within the range.

(Positive Electrode (Cathode) Active Material)

The positive electrode (cathode) active material of the present disclosure includes a blend of (A) a doped lithium manganese iron phosphate compound (referred to herein as dLMFP) according to formula (1) described below with (B) a lithium nickel cobalt manganese oxide (NMC) compound having a Ni content greater than 0.6 relative to the total amount of metals except Li and/or a lithium nickel cobalt aluminum oxide (NCA) compound.

(dLMFP)

Lithium manganese iron phosphate (LMFP) compounds and their synthesis are well known, as described, for example, in the background section above. The doped lithium manganese iron phosphate (dLMFP) compound for use in the positive electrode active material according to the present disclosure is a compound according to formula (1) below:

$$LiMn_xFe_yM_{1-x-y}PO_4 \quad (1),$$

wherein, in formula (1):
0.9<x+y<1; and
M is one or more of Co, Ni, V, Y, Mg, Ca, Ba, Al, Sc and Nd.

In one embodiment of the dLMFP compound according to formula (1), M is one or more of Mg, Ca, Ba. In a preferred embodiment, M is Mg.

The use of the dLMFP compound according to formula (1) as a positive electrode active material provides advantageous results as compared to LMFP. For example, it is contemplated that doping LMFP with Mg (i.e., the dLMFP compound according to formula (1) where M is Mg) can suppress Mn and Fe dissolution and also improve electrochemical performance of LMFP.

The positive electrode active material of the disclosure is blended with the lithium nickel cobalt manganese oxide (NMC) compound and/or the lithium nickel cobalt aluminum oxide (NCA) compound.

NMC and NCA (used separately or together) have a potential equal or lower than dLMFP. Since the dLMFP and the NMC and/or NCA are operated in the same voltage window in a cell, the potential mentioned above is defined as a quotient of total discharge energy (Wh) divided by total discharge capacity (Ah) of the individual component.

The dLMFP compounds according to formula (1) have very flat charge/discharge plateaus. This is shown in FIG. 1 (discussed further below in the Examples). This can make it difficult for battery monitoring systems (BMS) to monitor status of charge to predict remaining energy precisely for further utilization. However, it was found that blending dLMFP with NMC and/or NCA generates a voltage slope at the beginning and end of charge/discharge, which benefits BMS but also improves energy density. It was also found that blending dLMFP with NMC and/or NCA improves coating quality, adhesion and electrode density of dLMFP. It was also found that blending dLMFP with NMC and/or NCA significantly improves rate capability and cycle life of dLMFP.

(NMC)

The NMC compound (or lithiated oxide of Ni, Mn and Co) for use in the positive electrode active material according to the present disclosure can be any known NMC compound for use as a positive electrode active material, except that the content of Ni is greater than 0.6 relative to the total amount of metals except Li as explained below.

NMC compounds and their synthesis for use as a positive electrode active material are well known. For example, U.S. Patent Application No. 2018/0145314 is incorporated herein by reference in its entirety for its disclosure of NMC compounds. In a preferred embodiment, the NMC compound is according to the following formula (2):

$$Li_{(1+x)}Ni_aMn_bCo_cM'_dO_2 \quad (2),$$

wherein, in formula (2):
0≤x≤0.15,
a>0.6 b>0; c>0; d≥0 and a+b+c+d=1, and
M' is one or more selected from B, Mg, Al, Si, Ca, Ti, V, Cr, Fe, Cu, Zn, Y, Zr, Nb, and Mo.

According to certain embodiments of the NMC compound according to formula (2), 0.40>b≥0.15; or 0.35≥b≥0.20.

According to certain embodiments of the NMC compound according to formula (2), 0.30≥c≥0.10; or 0.25≥c≥0.15.

According to certain embodiments of the NMC compound according to formula (2), x≤0.10; or 0.01≤x≤0.06.

Specific examples of an NMC compound according to formula (2) are:
$LiNi_{0.605}Mn_{0.197}Co_{0.198}O_2$ (also referred to herein as NMC 622); and
$Li_{1+x}Ni_{0.8}Mn_{0.1}Co_{0.1}O_2$ (also referred to herein as NMC 811) with 0.01≤x≤0.10, preferably 0.01≤x≤0.06.

According to other embodiments of the disclosure, when both the NMC compound and the NCA compound are included in the blend, the content of Ni in the NMC compound can be less than or equal to 0.6 relative to the total amount of metals except Li (e.g., when the NCA compound is blended with the dLMFP compound, the NMC compound could be $LiNi_{1/3}Mn_{1/3}Co_{1/3}O_2$).

(NCA)

NCA compounds for use as a positive electrode active material are well known. Any known lithiated oxide of Ni, Co and Al can be used as the NCA compound. In one preferred embodiment, the NCA compound is $LiNi_{0.8}Co_{0.15}Al_{0.05}O_2$.

The NCA compound can also be a compound according to the following formula (3):

$$Li_{1+x}(Ni_aCo_bAl_c)O_2 \quad (3),$$

wherein, in formula (3):
a, b and c are non-zero,
a+b+c=1, and
0≤x≤0.15.

(Blend Ratios of the Positive Electrode Active Material)

In a preferred embodiment, the weight ratio of the blend of dLMFP with a total of NMC and/or NCA (i.e., dLMFP: (NMC+NCA)) is greater than 70 wt % of dLMFP and less than 30 wt % of NMC and/or NCA, when a total content of dLMFP, NMC and NCA in the positive electrode active material is considered 100 wt % (or this weight ratio can be simplified as the range >70:<30 to 99:1). In other preferred embodiments of the positive electrode active material according to the present disclosure, the weight ratio dLMFP: (NMC+NCA) can be 75:25; 80:20; 85:15; 90:10; 95:5; 96:4; 97:3; 98:2; or 99:1.

When the blend contains the dLMFP compound and the NMC compound, the weight ratio dLMFP:NMC can be >70:<30; 75:25; 80:20; 85:15; 90:10; 95:5; 96:4; 97:3; 98:2; or 99:1.

When the blend contains the dLMFP compound and the NCA compound, the weight ratio dLMFP:NCA can be >70:<30; 75:25; 80:20; 85:15; 90:10; 95:5; 96:4; 97:3; 98:2; or 99:1

In embodiments where both the NMC compound and the NCA compound are included, the weight ratio range of NMC to NCA (NMC:NCA) can be 1:99 to 99:1 by weight. In other embodiments, the weight ratio range of NMC:NCA can be 1:9 to 9:1; 2:8 to 8:2; 3:7 to 7:3; 4:6 to 6:4; or 1:1.

(Lithium-Ion Battery)

Also provided by the present disclosure is a lithium-ion battery including a cathode having the positive electrode active material of the present disclosure, an anode, and an electrolytic solution. A separator can be disposed between the anode and the cathode.

(Cathode)

The structure of the cathode is not particularly limited, except that the cathode includes at least the positive electrode active material of the present disclosure on a current collector. The cathode material can also include one or more binder materials and one or more conductive materials.

In preferred embodiments, the positive electrode active material of the present disclosure accounts for 100 wt % of the active material of the cathode material. However, it is contemplated that, in other embodiments, the positive electrode material could include another known active material, such that the positive electrode active material of the present disclosure might account for 10 wt % or more of the active material of the cathode material, such as amounts of 20 wt % or more, 30 wt % or more, 40 wt % or more, 50 wt % or more; 60 wt % or more; 70% or more; 80% or more; 90% or more; 95% or more; or 99% or more.

The current collector is not particularly limited and known materials and designs can be used. In a preferred embodiment, the current collector is a two-dimensional conducting support such as a solid or perforated sheet, based on carbon or metal, for example in nickel, steel, stainless steel or aluminum.

The binder material is not particularly limited and known materials for this function can be used. For example, the binder material may contain one or more of the following components: polyvinylidene fluoride (PVdF) and its copolymers, polytetrafluoroethylene (PTFE), polyacrylonitrile (PAN), polymethyl or polybutyl methacrylate, polyvinyl chloride (PVC), polyvinylformal, polyesters and amide block polyethers, polymers of acrylic acid, methylacrylic acid, acrylamide, itaconic acid, sulfonic acid, elastomers and cellulose compounds.

Among the elastomers which may be used, mention may be made of ethylene/propylene/diene terpolymers (EPDM), styrene/butadiene copolymers (SBR), acrylonitrile/butadiene copolymers (NBR), styrene/butadiene/styrene block copolymers (SBS) or styrene/acrylonitrile/styrene block copolymers (SIS), styrene/ethylene/butylene/styrene copolymers (SEBS), styrene/butadiene/vinylpyridine terpolymers (SBVR), polyurethanes (PU), neoprenes, polyisobutylenes (PIB), butyl rubbers and mixtures thereof.

The cellulose compound may be, for example, a carboxymethylcellulose (CMC), a hydroxypropylmethylcellulose (HPMC), a hydroxypropylcellulose (HPC), a hydroxyethylcellulose (HEC) or other cellulose derivative.

The conductive material is not particularly limited and any known conductive material can be used. For example, the conductive material can be selected from graphite, carbon black, acetylene black (AB), soot or one of their mixtures.

To make the cathode, the cathode material can be combined with a binder material and a conductive material and applied to a current collector by a known method. For example, it is contemplated that granules including the cathode material could be formed and pressed to the current collector by a known method, or a slurry including the cathode material and a solvent could be coated on the current collector and then dried by a known method.

The amounts of a binder, conductive material and other additives are not particularly limited. The amount of the conductive material is preferably 1 wt % to 20 wt % (or any amount within this range, e.g., 4 wt % to 18 wt %), and the amount of the binder is preferably 1 wt % to 20 wt % (or any amount within this range, e.g., 1 wt % to 7 wt %), when a total weight of the positive electrode material is considered 100 wt %.

(Anode)

The structure of the negative electrode (or anode) is not particularly limited and known anode active materials can be used, as long as the material can function as the negative electrode active material of the lithium-ion battery. For example, the active material of the anode can include carbon-based negative electrode active materials, such as graphite and coke, alloy-based negative electrode active materials such as Si and/or Sn, a lithium metal, a lithium titanate oxide (LTO), or a blend thereof. Similar to the cathode, the anode material can include the anode active material and a binder, and the anode material can be applied to a current collector. In a preferred embodiment, the anode active material of the present disclosure can account for 50 wt % to 99 wt % of the anode material (or any amount within this range, e.g., 95 wt % to 99 wt %, or 97 wt % to 99 wt %) of the anode material.

(Electrolytic Solution)

The electrolytic solution can be a known non-aqueous electrolytic solution, which includes a lithium salt dissolved in a solvent.

The lithium salt is not particularly limited and known lithium salts for use in non-aqueous lithium-ion batteries can be used. In preferred embodiments, the electrolyte salt may include one or more of lithium bis(fluorosulfonyl)imide ("LiFSI"), lithium bis(trifluoromethanesulfonyl)imide ("LiTFSI"), $LiBF_4$, lithium bis(oxalato)borate ("LiBOB"), $LiClO_4$, $LiAsF_6$, $LiPF_6$, $LiCF_3SO_3$, lithium 4,5-dicyano-2-(trifluoromethyl)imidazole ("LiTDI"), $LiPO_2F_2$, and the like.

In preferred embodiments, the lithium salt concentration in the electrolytic solution is more than 1.0M, more than 1.2M, more than 1.4M, more than 1.5M, more than 1.6M, more than 1.7M, more than 1.8M, or more than 2.0M. In preferred embodiments, the salt concentration is less than 4.0M, less than 3.6M, less than 3.2M, less than 2.8M, less than 2.4M, less than 2.0M, less than 1.6M, or less than 1.2M.

The solvent is not particularly limited and known solvents for non-aqueous lithium-ion batteries can be used. The solvent can be a single solvent or a mixture of a plurality solvents. The solvent can be selected from usual organic solvents, notably saturated cyclic carbonates, unsaturated cyclic carbonates, non-cyclic (or linear) carbonates, alkyl esters such as formates, acetates, propionates or butyrates, ethers, lactones such as gamma-butyrolactone, tetrahydrothiophene bioxide, nitrile solvents and mixtures thereof. Among such saturated cyclic carbonates, specific mention may be made, for example, of ethylene carbonate (EC), propylene carbonate (PC), butylene carbonate (BC), and mixtures thereof. Among unsaturated cyclic carbonates, specific mention may be made, for example, of vinylene carbonate (VC), its derivatives and mixtures thereof. Among non-cyclic carbonates, specific mention may be made, for example, of dimethyl carbonate (DMC), diethyl carbonate (DEC), ethyl methyl carbonate (EMC), dipropyl carbonate (DPC) and mixtures thereof. Among the alkyl esters, specific mention may be made, for example, of methyl acetate, ethyl acetate, methyl propionate, ethyl propionate, butyl propionate, methyl butyrate, ethyl butyrate, propyl butyrate and mixtures thereof. Among the ethers, mention may for example be made of dimethyl ether (DME) or diethyl ether (DEE), and mixtures thereof. Known fluorinated solvents can also be used, including, for example, fluorinated benzenes (such as hexafluorobenzene, pentafluorobenzene, 1,2,3,4-tetrafluorobenzene, etc.), fluorine substituted linear carbonates, etc.

The electrolytic solution may include a known additive for use in a non-aqueous lithium-ion battery.

One type of additive that may be included in the electrolytic solution is a gas-generation agent used for implementing a pressure-type current interrupt device (CID). Exemplary gas-generation agents include cyclohexylbenzene (CHB), biphenyls, and fluorinated biphenyls having an oxidation potential lower than that of the solvent in the electrolyte solution. When the lithium-ion battery reaches an overcharged state, the compound reacts to generate gas before the electrolyte solution decomposes. When included, the amount of the gas-generation agent is preferably 0.01 wt % to 10 wt % (or any amount within this range, such as, for example, 0.1 wt % to 5 wt %; or 1 wt % to 3 wt %).

Specific mention can also be made to the use of known fluorinated compound additives. For example, the commonly used additive fluorinated ethylene carbonate (FEC) may be included in the electrolytic solution. When included, FEC (and/or another additive) can be added to the solvent in an amount of 0.1 to 10 wt % based on the total weight of the solvent, or can be added in any amount with this range, such as, for example, 1 to 10 wt %, 2 to 9 wt %, 3 to 8 wt %, 4 to 7 wt %, 5 to 6 wt %, 1 to 5 wt %, 1 to 4 wt %, 1 to 3 wt %, 1 to 2 wt %, 2 to 3 wt %, or 0.1 to 1 wt %.

(Separator)

The separator is not particularly limited and known separators for use in non-aqueous lithium-ion batteries can be used. The separator allows Li+ to pass therethrough and prevents electrical contact between the anode and cathode. In one embodiment, the separator is a microporous membrane made of a polyolefin-based material, such as, for example, a microporous membrane made of polyethylene (PE), polypropylene (PP) or the like.

EXAMPLES

In the following, although embodiments of the present disclosure are described in further detail by means of Examples, the present disclosure is not limited thereto.

Example 1

In Example 1, Cells 1A, 1B, 1C, 1D and 1E were prepared to measure voltage (V) versus depth of discharge (DoD) (%) and capacity (mAh/g) for dLMFP as compared to dLMFP blended with NMC622 ($LiNi_{0.605}Mn_{0.197}Co_{0.198}O_2$). Each cell employed lithium metal as the anode and an electrolytic solution containing 1 M $LiPF_6$ in a mixed organic solvent (EC/EMC/DMC at a volume ratio of 1:1:1). The only difference in these cells was the positive active material. For Cell 1A, the positive active material was pure Mg doped LMFP ($LiMn_{0.75}Fe_{0.2}Mg_{0.05}PO_4$). For Cell 1B, the same Mg doped LMFP compound used in Cell 1A was blended with a NMC compound ($LiNi_{0.605}Mn_{0.197}Co_{0.198}O_2$) (or NMC622) at a weight ratio dLMFP:NMC of 90:10. For Cell 1C, the same Mg doped LMFP compound used in Cell 1A was blended with a NMC622 at a weight ratio dLMFP:NMC of 70:30. For Cell 1D, the same Mg doped LMFP compound used in Cell 1A was blended with a NMC622 at a weight ratio dLMFP:NMC of 40:60. For Cell 1E, the same Mg doped LMFP compound used in Cell 1A was blended with a NMC622 at a weight ratio dLMFP:NMC of 10:90. A summary of Cells 1A to 1E is shown in Table 1. Cells 1A and 1B were discharged at a constant rate (0.1C) at a temperature of about 25° C. to measure voltage (V) versus depth of discharge (DoD) (%) and capacity (mAh/g). The results of Example 1 are shown in FIGS. 1A and 1B.

TABLE 1

| Cell | Anode | Cathode | Electrolytic Solution |
| --- | --- | --- | --- |
| Cell 1A | lithium metal | dLMFP | 1M $LiPF_6$ in EC/EMC/DMC (1:1:1) |
| Cell 1B | lithium metal | dLMFP:NMC622 (90:10) | 1M $LiPF_6$ in EC/EMC/DMC (1:1:1) |
| Cell 1C | lithium metal | dLMFP:NMC622 (70:30) | 1M $LiPF_6$ in EC/EMC/DMC (1:1:1) |
| Cell 1D | lithium metal | dLMFP:NMC622 (40:60) | 1M $LiPF_6$ in EC/EMC/DMC (1:1:1) |
| Cell 1E | lithium metal | dLMFP:NMC622 (10:90) | 1M $LiPF_6$ in EC/EMC/DMC (1:1:1) |

Figure 1B:
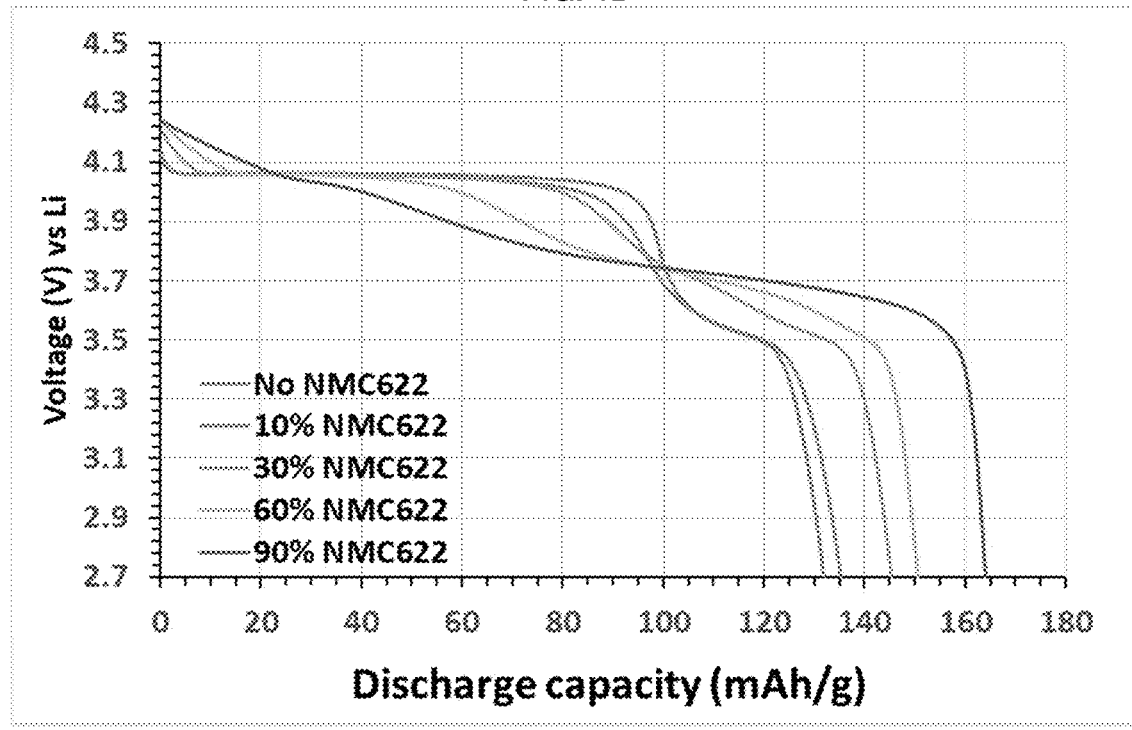
FIG. 1B is a graph showing voltage (V) versus discharge capacity (mAh/g) for the half cells prepared in Example 1.

As shown in FIG. 1A, pure dLMFP had a very flat discharge plateau, which would make it difficult for BMS to monitor the status of the charge, such as for predicting the remaining energy for further utilization. However, FIG. 1A also shows that adding NMC622 (10 wt % to 90%) generates a voltage slope at both the beginning and the end of the charge/discharge characteristic. This not only benefits BMS but also improves energy density (as shown in FIG. 1B) since NMC622 has higher capacity comparing to dLMFP. The result is beyond what was expected.

Example 2

In Example 2, Cells 2A-2E were prepared in the same manner as in Example 1, except that, for the cells with an active material blend, $Li_1Ni_{0.8}Mn_{0.1}Co_{0.1}O_2$ (or NMC811) was used instead of NMC622. Cell 2A contained the same pure Mg doped dLMFP as in Example 1, and Cells 2B-2E contained a blend of the Mg doped dLMFP with NMC811. A summary of Cells 2A-2E is shown in Table 2. The results of Example 2 are shown in FIGS. 2A and 2B.

TABLE 2

| Cell | Anode | Cathode | Electrolytic Solution |
| --- | --- | --- | --- |
| Cell 2A | lithium metal | dLMFP | 1M $LiPF_6$ in EC/EMC/DMC (1:1:1) |
| Cell 2B | lithium metal | dLMFP:NMC811 (90:10) | 1M $LiPF_6$ in EC/EMC/DMC (1:1:1) |
| Cell 2C | lithium metal | dLMFP:NMC811 (70:30) | 1M $LiPF_6$ in EC/EMC/DMC (1:1:1) |
| Cell 2D | lithium metal | dLMFP:NMC811 (40:60) | 1M $LiPF_6$ in EC/EMC/DMC (1:1:1) |
| Cell 2E | lithium metal | dLMFP:NMC811 (10:90) | 1M $LiPF_6$ in EC/EMC/DMC (1:1:1) |

Figure 2A:
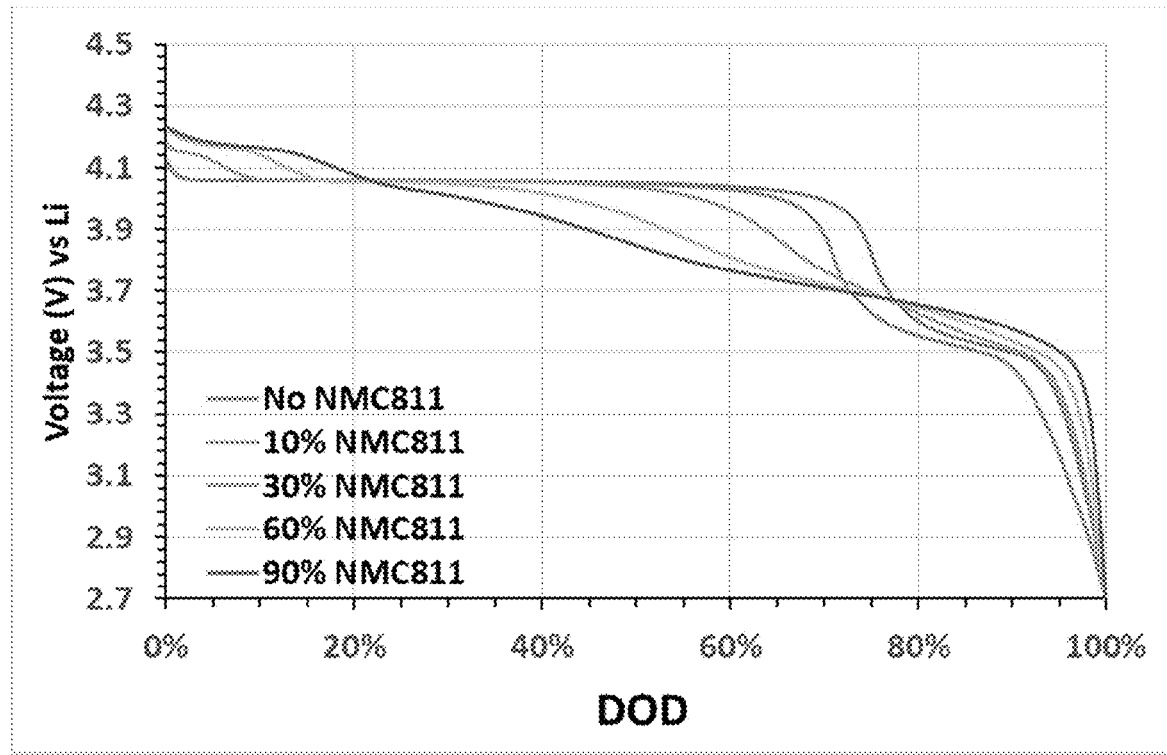
FIG. 2A is a graph showing voltage (V) versus depth of discharge (DoD) for the half cells prepared in Example 2.
Figure 2B:
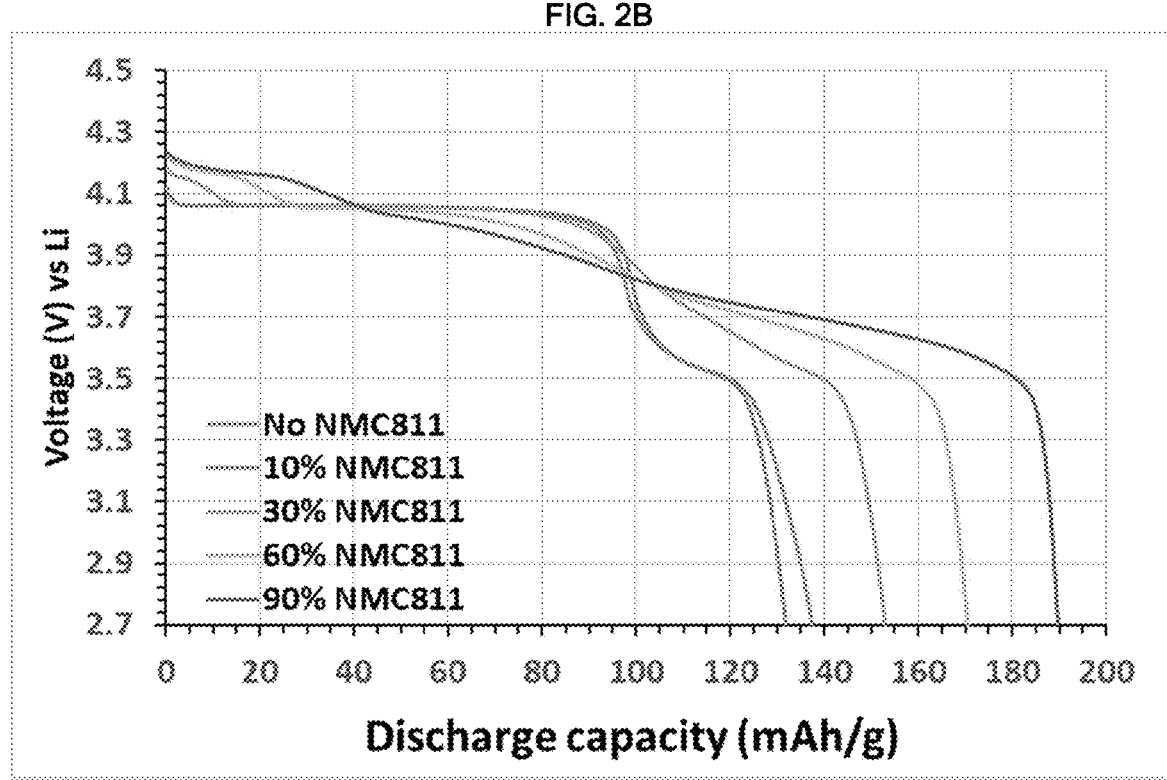
FIG. 2B is a graph showing voltage (V) versus discharge capacity (mAh/g) for the half cells prepared in Example 2.

As shown in FIG. 2A, pure dLMFP had a very flat discharge plateau, which would make it difficult for BMS to monitor the status of the charge, such as for predicting the remaining energy for further utilization. However, FIG. 2A also shows that adding NMC811 (10 wt % to 90%) generates a voltage slope at both the beginning and the end of the charge/discharge characteristic. This not only benefits BMS but also improves energy density (as shown in FIG. 2B) since NMC811 has higher capacity comparing to dLMFP. The result is beyond what was expected.

Example 3

Figure 3:
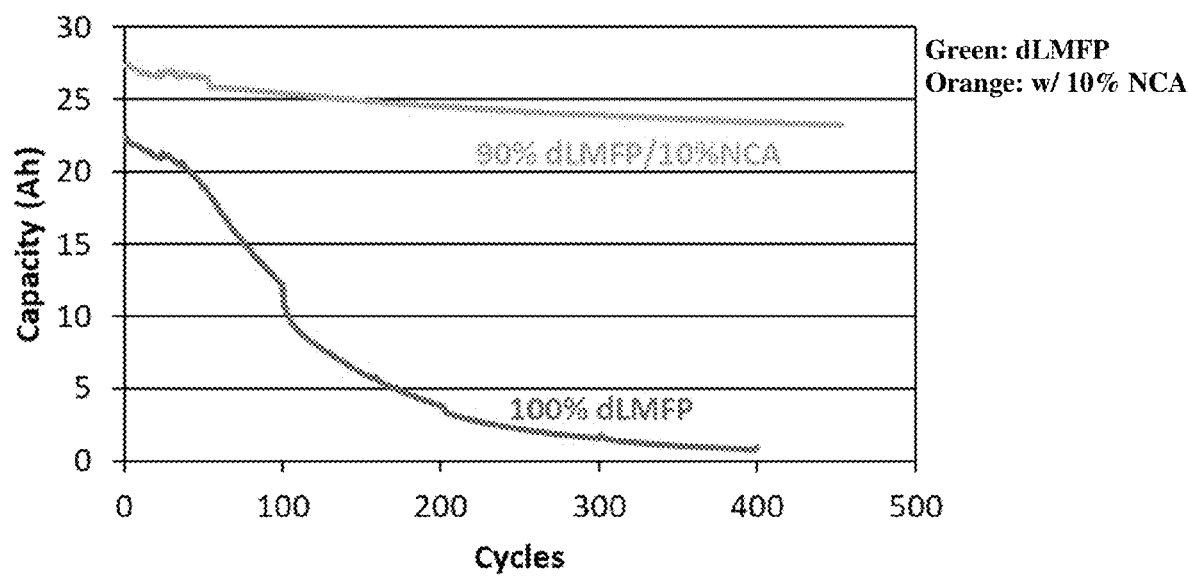
FIG. 3 is a graphing showing capacity retention results for the prismatic cell prepared in Example 3.

In Example 3, prismatic Cells 3A and 3B were prepared to measure capacity over about 400 cycles. Each cell employed graphite as the anode and the same electrolytic solution used in Cells 1A and 1B of Example 1. The only difference between Cells 3A and 3B was the positive active material. Cell 3A used the same Mg doped LMFP compound as Example 1. For Cell 3B, the same Mg doped LMFP compound was blended with a NCA compound ($Li_{1.04}Ni_{0.8}Co_{0.15}Al_{0.05}O_2$) at a weight ratio dLMFP:NCA of 90:10. A summary of Cells 3A and 3B is shown in Table 3. The measurements were performed by repeatedly charging and discharging the cells. Both Cell 3A and 3B have exactly same cell format, same electrolyte, same anode and same loading for both electrodes. Other than the 10% NCA in Cell 3B to replace same amount of dLMFP, the rest are same in both cells. The results of Example 3 are shown in FIG. 3 (Cell 3A=green line; Cell 3B=orange line).

TABLE 3

| Cell | Anode | Cathode | Electrolytic Solution |
| --- | --- | --- | --- |
| Cell 4A | graphite | dLMFP | 1M $LiPF_6$ in EC/EMC/DMC (1:1:1) |
| Cell 4B | graphite | dLMFP:NCA (90:10) | 1M $LiPF_6$ in EC/EMC/DMC (1:1:1) |

As shown in FIG. 3, adding NCA as the minor component (10 wt %) provided both significantly improved capacity and better cycle life. The result is beyond what was expected.

Example 4

Figure 4:
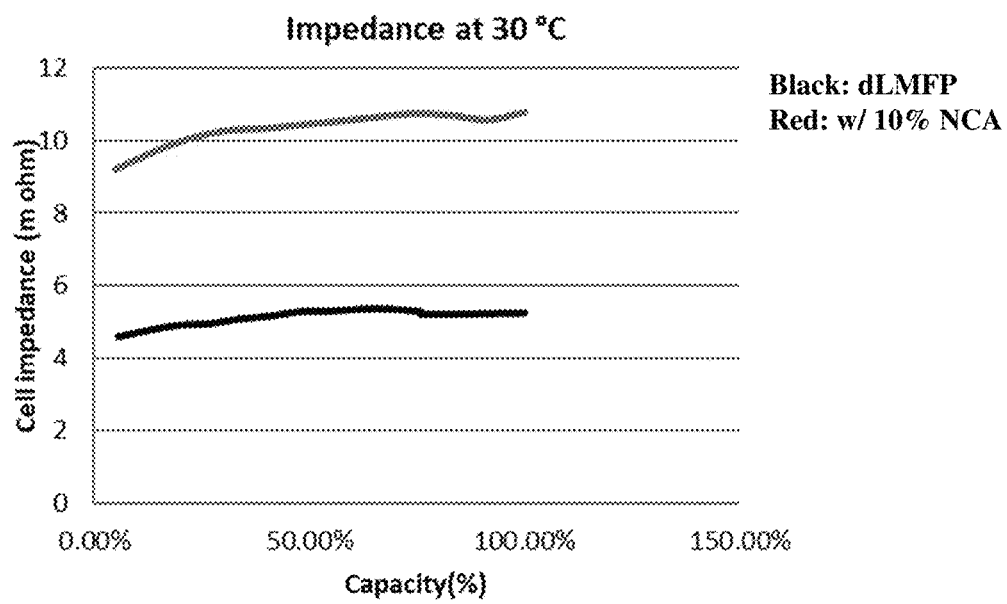
FIG. 4 is a graph showing cell impedance (m ohm) at 30° C. versus capacity (%) for the 45 Ah cylindrical cell prepared in Example 4.

In Example 4, 45 Ah cylindrical Cells 4A and 4B were prepared to measure cell impedance (m ohm) versus capacity (%). Each cell employed graphite as the anode and the same electrolytic solution used in Cells 1A and 1B of Example 1. The only difference between Cells 4A and 4B was the positive active material. Cells 4A and 4B employed the same positive active material as Cells 3A and 3B in Example 3, respectively. A summary of Cells 4A and 4B is shown in Table 4. The cells were cycled between 2.7 to 4.2V. Cells tested here are same cells in FIG. 3. The results of Example 4 are shown in FIG. 4 (Cell 4A=red line; Cell 4B=black line).

TABLE 4

| Cell | Anode | Cathode | Electrolytic Solution |
|---|---|---|---|
| Cell 5A | graphite | dLMFP | 1M LiPF$_6$ in EC/EMC/DMC (1:1:1) |
| Cell 5B | graphite | dLMFP:NCA (90:10) | 1M LiPF$_6$ in EC/EMC/DMC (1:1:1) |

As shown in FIG. 4, adding NCA as the minor component (10 wt %) provided significantly lower internal impedance. The result is beyond what was expected.

Example 5

Figure 5:
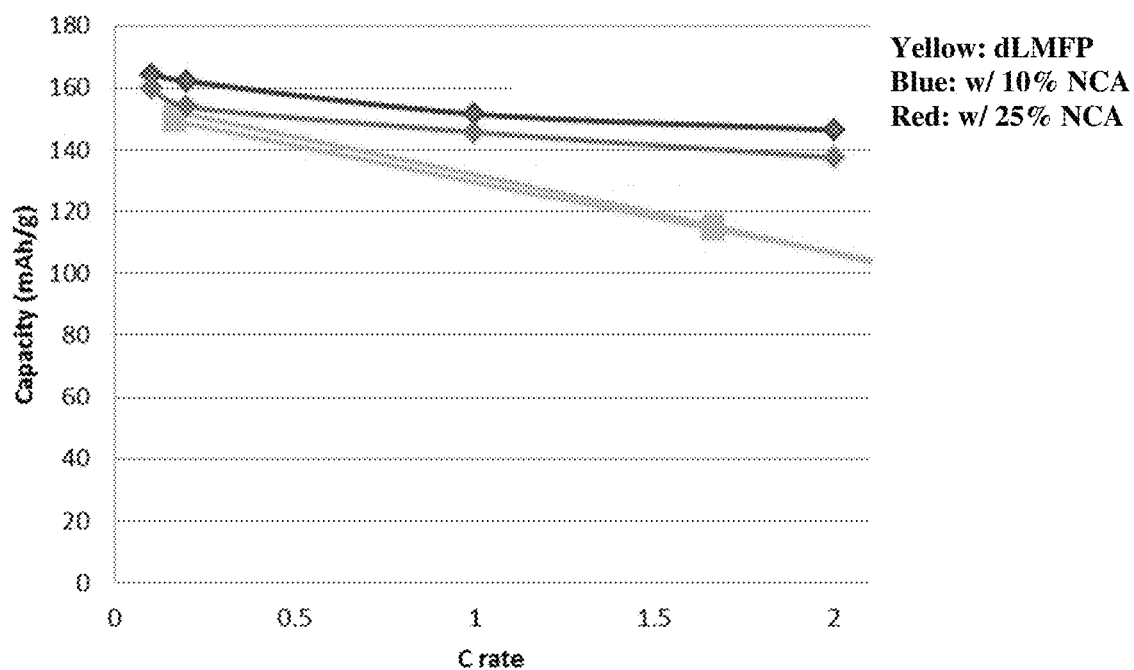
FIG. 5 is a graph showing rate capability for the half cells prepared in Example 5.

In Example 5, Cells 5A, 5B and 5C were prepared to measure rate capability. Each cell employed graphite as the anode and the same electrolyte solution used in Example 1. The only difference between Cells 5A, 5B and 5C was the positive active material. Each cell employed the same Mg doped dLMFP compound used in Example 1. Cell 5A employed pure dLMFP. Cell 5B blended the dLMFP with the NCA compound used in Example 3 at a weight ratio dLMFP:NCA of 90:10. Cell 5C blended the dLMFP with the same NCA compound used in Example 3 at a weight ratio dLMFP:NCA of 75:25. A summary of Cells 5A to 5C is shown in Table 5. The results are shown in FIG. 5 (Cell 5A=yellow line; Cell 5B=blue line; Cell 5C=red line).

TABLE 5

| Cell | Anode | Cathode | Electrolytic Solution |
|---|---|---|---|
| Cell 6A | graphite | dLMFP | 1M LiPF$_6$ in EC/EMC/DMC (1:1:1) |
| Cell 6B | graphite | dLMFP:NCA (90:10) | 1M LiPF$_6$ in EC/EMC/DMC (1:1:1) |
| Cell 6C | graphite | dLMFP:NCA (75:25) | 1M LiPF$_6$ in EC/EMC/DMC (1:1:1) |

As shown in FIG. 5, adding NCA as the minor component (10 wt % or 25 wt %) provided improved rate capability. The result is beyond what was expected.

The disclosure is susceptible to various modifications and alternative means, and specific examples thereof are herein described in detail. It should be understood, however, that the disclosure is not to be limited to the particular examples or methods disclosed, but to the contrary, the disclosure is to cover all modifications, equivalents, and alternatives falling within the spirit and scope of the claims.

The invention claimed is:

1. A positive electrode active material for use in a lithium-ion secondary battery, the positive electrode active material comprising a blend of a doped lithium manganese iron phosphate (dLMFP) olivine compound according to the following formula (1) with one or both of a lithium nickel manganese cobalt oxide (NMC) compound according to the following formula (2) or a lithium nickel cobalt aluminum (NCA) compound according to the following formula (3):

$$LiMn_xFe_yM_{1-x-y}PO_4 \quad (1),$$

wherein, in formula (1):
0<x, 0<y, 0.9<x+y<1, and
M is one or more selected from the group consisting of Y, Ca, Ba, and Nd;

$$Li_{1+x}Ni_aMn_bCo_cM'_dO_2 \quad (2),$$

wherein, in formula (2):
0≤x≤0.15,
a>0.6, b>0; c>0; d≥0 and a+b+c+d=1, and
M' is one or more selected from B, Mg, Al, Si, Ca, Ti, V, Cr, Fe, Cu, Zn, Y, Zr, Nb, and Mo;

$$Li_{1+x}(Ni_aCo_bAl_c)O_2 \quad (3),$$

wherein, in formula (3):
a, b and c are non-zero;
a+b+c=1; and
0≤x≤0.15,
wherein, a weight ratio of dLMFP with respect to one or both of the lithium nickel manganese cobalt oxide (NMC) compound and the lithium nickel cobalt aluminum (NCA) compound is from 85:15 to 99:1.

2. The positive electrode active material according to claim 1, wherein the blend includes both the lithium nickel cobalt manganese oxide (NMC) compound and the lithium nickel cobalt aluminum oxide (NCA) compound.

3. The positive electrode active material according to claim 2, wherein a weight ratio of the NMC compound to the NCA compound (NMC:NCA) is 1:99 to 99:1 by weight.

4. The positive electrode active material according to claim 1, wherein the lithium nickel cobalt manganese oxide (NMC) compound is included in the blend.

5. The positive electrode active material according to claim 4, wherein the NMC compound is selected from $LiNi_{0.605}Mn_{0.197}Co_{0.198}O_2$ or $Li_{1+x}Ni_{0.8}Mn_{0.1}Co_{0.1}O_2$ with 0.01≤x≤0.10.

6. The positive electrode active material according to claim 4, wherein the NMC compound is $LiNi_{0.8}Mn_{0.1}Co_{0.1}O_2$.

7. The positive electrode active material according to claim 4, wherein the NMC compound is $LiNi_{0.605}Mn_{0.197}Co_{0.198}O_2$.

8. The positive electrode active material according to claim 1, wherein the lithium nickel cobalt aluminum oxide (NCA) compound is included in the blend.

9. The positive electrode active material according to claim 8, wherein the NCA compound is $LiNi_{0.8}Co_{0.15}Al_{0.05}O_2$.

10. The positive electrode active material according to claim 1, wherein the NMC compound is $LiNi_{0.605}Mn_{0.197}Co_{0.198}O_2$ and the NCA compound is $LiNi_{0.8}Co_{0.15}Al_{0.05}O_2$.

11. The positive electrode active material according to claim 1, wherein the NMC compound is $Li_{1+x}Ni_{0.8}Mn_{0.1}Co_{0.1}O_2$ with 0.01≤x≤0.10 and the NCA compound is $LiNi_{0.8}Co_{0.15}Al_{0.05}O_2$.

12. The positive electrode active material according to claim 1, wherein the weight ratio dLMFP:NCA is ≥90:≤10 to 99:1.

13. The positive electrode active material according to claim 12, wherein the weight ratio dLMFP:NCA is >90:<10 to 99:1.

14. The positive electrode active material according to claim 1, wherein M is one or more selected from the group consisting of Y, Ba and Nd.

15. A positive electrode active material for use in a lithium-ion secondary battery, the positive electrode active material comprising a blend of a doped lithium manganese iron phosphate (dLMFP) olivine compound according to the following formula (1) with a lithium nickel manganese cobalt oxide (NMC) compound according to the following formula (2):

$$LiMn_xFe_yM_{1-x-y}PO_4 \quad (1),$$

wherein, in formula (1):
$0<x$, $0<y$, $0.9<x+y<1$, and
M is one or more selected from the group consisting of Y, Ca, Ba, and Nd;

$$Li_{1+x}Ni_aMn_bCo_cM'_dO_2 \quad (2),$$

wherein, in formula (2):
$0 \leq x \leq 0.15$,
$a>0.6$, $b>0$; $c>0$; $d \geq 0$ and $a+b+c+d=1$, and
M' is one or more selected from B, Mg, Al, Si, Ca, Ti, V, Cr, Fe, Cu, Zn, Y, Zr, Nb, and Mo;
wherein a weight ratio of the dLMFP compound to the NMC compound (dLMFP:NMC) is from 85:15 to 99:1.

16. A positive electrode active material for use in a lithium-ion secondary battery, the positive electrode active material comprising a blend of a doped lithium manganese iron phosphate (dLMFP) olivine compound according to the following formula (1) with a lithium nickel cobalt aluminum (NCA) compound according to the following formula (3):

$$LiMn_xFe_yM_{1-x-y}PO_4 \quad (1),$$

wherein, in formula (1):
$0<x$, $0<y$, $0.9<x+y<1$, and
M is one or more selected from the group consisting of Y, Ca, Ba, and Nd;

$$Li_{1+x}(Ni_aCo_bAl_c)O_2 \quad (3),$$

wherein, in formula (3):
a, b and c are non-zero,
$a+b+c=1$, and
$0 \leq x \leq 0.15$;
wherein a weight ratio of the dLMFP compound to the NCA compound (dLMFP:NCA) is from 85:15 to 99:1.

17. A lithium-ion secondary battery, comprising:
a cathode including the positive electrode active material according to claim 1,
an anode including a negative electrode active material, and
an electrolytic solution including a lithium salt and an organic solvent.

* * * * *